United States Patent [19]

Sunouchi et al.

[11] 4,443,089
[45] Apr. 17, 1984

[54] FILM WINDING AND REWINDING DEVICE FOR CAMERA

[75] Inventors: Akio Sunouchi, Tokyo; Tatsuo Konno, Kanagawa; Masahisa Fujino, Tokyo; Ryuji Suzuki, Kanagawa, all of Japan

[73] Assignee: Canon Kabushiki Kaisha, Japan

[21] Appl. No.: 383,249

[22] Filed: May 28, 1982

[30] Foreign Application Priority Data

Jun. 11, 1981 [JP] Japan .................................. 56-90130

[51] Int. Cl.³ ............................................... G03B 1/00
[52] U.S. Cl. ................................................. 354/214
[58] Field of Search ................ 354/214, 268; 242/71.6

[56] References Cited

U.S. PATENT DOCUMENTS 3,550,513  12/1970  Johnson et al. .................... 354/268
4,135,801   1/1979  Sunouchi et al. ................... 354/214

Primary Examiner—John Gonzales
Attorney, Agent, or Firm—Toren, McGeady and Stanger

[57] ABSTRACT

A camera provided with a control member for changeover from the film winding to the film rewinding mode and an operating member for actuating the control member, wherein the operating member is made movable in a first direction followed by a second direction, whereby at the terminal end of movement of the operating member in the first direction, the operating member is rendered capable or actuating the changeover control member as it moves in the second direction.

9 Claims, 6 Drawing Figures

FILM WINDING AND REWINDING DEVICE FOR CAMERA

BACKGROUND OF THE INVENTION

1. Field of the Invention

This invention relates to a film winding and rewinding device for cameras which provides assurance that only intentional actuation of a changeover operation will effect establishment of either the film winding or rewinding modes.

2. Description of the Prior Art

In the past, the operating member for changing over a camera from the film winding mode to the film rewinding mode, namely, the rewind button, has been generally located in the bottom panel of the camera housing. However, because such cameras, have the rewind button provided at the bottom surface of the camera housing, during use with tripods attached to the bottom of the camera housing, there occurs a problem in that when it is desired to rewind the film, the tripod must be detached from the camera to allow for the rewind button to be actuated. Therefore, the mode changing operation is troublesome and time consuming.

Because of this, it has been proposed to employ an additional rewind button on, for example, the upper panel of the camera housing, as disclosed, for example, in U.S. Pat. No. 4,135,801 (filed Jan. 23, 1979). Since, however, in this case, the changeover operating member (rewind button) has to be arranged adjacent other operating members (for example, the winding lever, the shutter dial, or the like) from the standpoint of camera structure there arises the possibility of unintentional actuation of the changeover operating member (rewind button), thus creating an alternative problem. Also, if the photographer while unaware of the fact that the operating member has been actuated cocks the film winding lever, this will result in the spacings between successive picture frames will differ from each other because the sprocket can no longer control the advancement of the film through the length of exactly one frame.

Attempts have been made to eliminate such drawbacks by providing a cover above the second rewind button so that, as this cover usually inhibits access to the rewind button, the possibility of accidental actuation is eliminated. In such a camera, however, when it is desired to set the rewinding mode, it is necessary to move the cover to expose the head of the rewind button and to push down on the rewind button. Thus, the necessity for manipulating two members independently of each other increases the difficulty of management of the camera, and creates a drawback in that the change over operation from the winding to the rewinding mode cannot be simply carried out.

For example, in such camera, it is impossible for one hand to effect the changeover operation to the rewind mode. Also, the provision of the cover creates difficulties with regard to space utilization on the upper panel of the camera housing and increases the complexity of the structure.

SUMMARY OF THE INVENTION

With the foregoing in mind, it is an object of the invention to provide a film winding and rewinding device for a camera which with high reliability, can prevent the operating member utilized for changing over the camera from the film winding to the rewinding mode from being unintentionally actuated while enabling quick and easy performance of the mode changing operation by said member.

Another object of the invention is to provide a film winding and rewinding device for a camera in which actuation of a single member alone suffices to effect changeover of the camera from the film winding to the rewinding mode, while still making is possible to prevent accidental actuation of said operating member from occurring with high reliability.

These and other objects of the present invention will become apparent from the following detailed description of an embodiment thereof.

DETAILED DESCRIPTION OF THE PREFERRED EMBODIMENT

Figure 1:
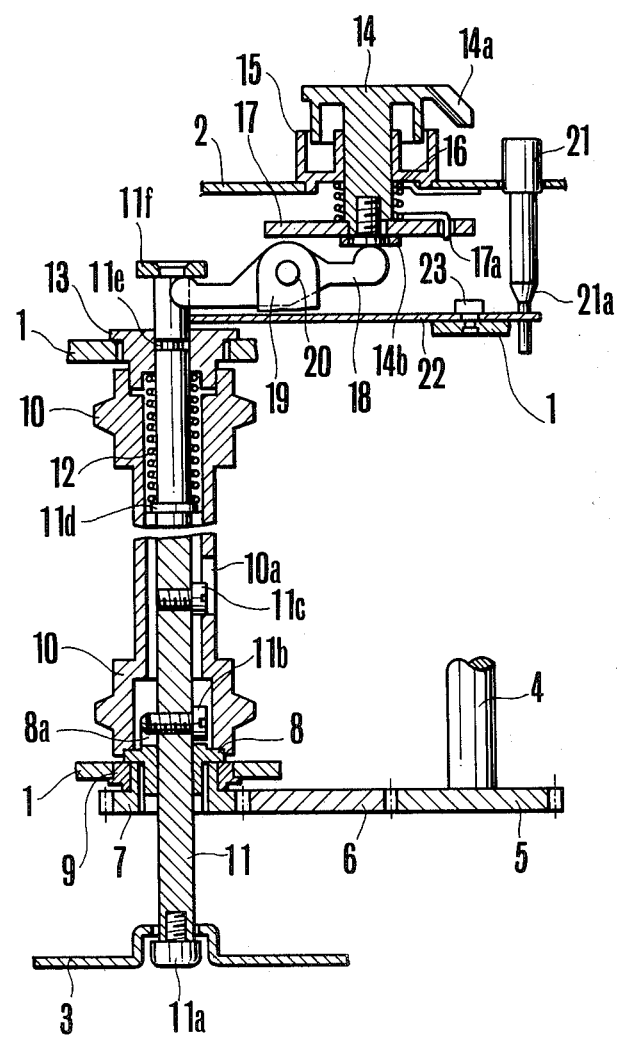
FIG. 1 is a sectional view of an embodiment of a film winding and rewinding device for a camera according to the present invention in a film winding position.

In FIG. 1, there is shown a camera housing 1 having an upper panel 2 and a bottom panel 3. A winding shaft 4 is drivenly connected to a winding lever 24 illustrated in FIG. 5. A gear 5 is fixed to the bottom end of the winding shaft 4 and meshes with an intermediate gear 6 which meshes with a sprocket gear 7. A clutch 8 is connected to the gear 7 in screw-threaded relation. A bearing 9 is fixed to the camera housing 1 and has an inner diameter in which is rotatably fitted a ring portion of the sprocket gear 7. A sprocket 10 for advancing the film (not shown) by one frame in each cycle of winding operation has its top end rotatably fitted in a bushing 13 which is fixed to the camera housing 1, and its bottom end rotatably fitted on the outer diameter of the clutch 8.

A sprocket shaft 11 has a second rewind button 11a fixed to the bottom end thereof and projecting outwardly of the bottom panel 3, and fixedly carries a clutch member 11b and a drive connection member 11c. The clutch member 11b is arranged upon setting in the winding mode to engage in a recess 8a of the clutch 8 so that the clutch 8 and sprocket shaft 11 rotate in unison. The drive connection member 11c has its head lying in a longitudinal cutout 10a of the sprocket 10 so that rotation of the sprocket shaft 11 is transmitted to the sprocket 10. The sprocket shaft 11 has a stepped portion 11d, and a spring 12 acting between this stepped portion 11d and the bushing 13 urges the sprocket shaft 11 always downwards. A circumferential groove 11e is provided in the sprocket shaft 11 arranged so that when the sprocket shaft 11 is lifted upwards to change over the camera to the rewinding mode, the free end of a latch lever 22 engages therein to inhibit the sprocket shaft from downward or returning movement, whereby the camera is retained in the rewinding mode. At the top end of the sprocket shaft 11 there is fixed a flange 11f against which one end of a changeover lever 18 abuts.

The changeover lever 18 is pivotally mounted on a shaft 20 which is mounted on a support member 19. The upper and lower portions of the sprocket shaft 11 are rotatably fitted in the inner diameter portions of the bushing 13 and clutch 8 respectively.

A first rewind button 14 having a finger abutment 14a cooperates with seat 15 of the button 14 fixed to the upper panel 2. A spring 16 lies between the seat 15 and a rewind actuation prohibiting member 17, with one end being connected to the upper panel 2 and its opposite end being connected in a hole 17a of the prohibiting member 17, so that the first rewind button 14 and the prohibiting member 17 are urged in a counter-clockwise direction as viewed in FIG. 3, and at the same time in a downward direction. However, since the downward bias force of the spring 16 is smaller than the bias force of the spring 12 which acts on the sprocket shaft 11 in a downward direction, the first rewind button 14 when not actuated assumes the position of FIG. 1. In other words, the downwardly directed component of the bias force of the spring 16 functions to maintain the first rewind button 14 with its lower surface always in abutting engagement on one end of the changeover lever 18.

Figure 3:
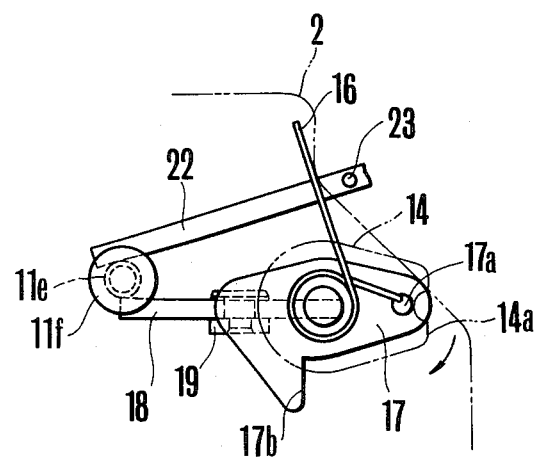
FIG. 3 is a top view of the device of FIG. 1.

The prohibiting member 17 is formed to a roughly letter "L" shape as illustrated in FIG. 3 with its rightward stroke 17b being arranged upon pushing down of the first rewind button 14 to engage the shaft 20 so that the prohibiting member 17 is not allowed counter-clockwise movement, the hole 17a being located near the top end of the down stroke and engaging one arm of the spring 16. Also, the prohibiting member 17 is fixed to the first rewind button 14 by a screw fastener 14b and is made rotatable as a unit with the first rewind button 14.

Also as illustrated in FIG. 3, when in the winding mode, the corner of the L-shaped prohibiting member 17 confronts the upper portion of the shaft support member 19 so that the first rewind button 14 is hindered from moving downwards. The latch lever 22 is urged always in a clockwise direction as viewed in FIG. 3 by a spring (not shown), with its one end abutting on the side of the sprocket shaft 11, and its opposite end confronting a shutter release member 21. The latch lever 22 is pivotally mounted on a pin 23 fixed to the camera housing. The shutter release member 21 has a tapered portion 21a. When the release member 21 is pushed down, this tapered portion 21a functions to turn the latch lever 22 in the clockwise direction about the pivot pin 23.

Figure 2:
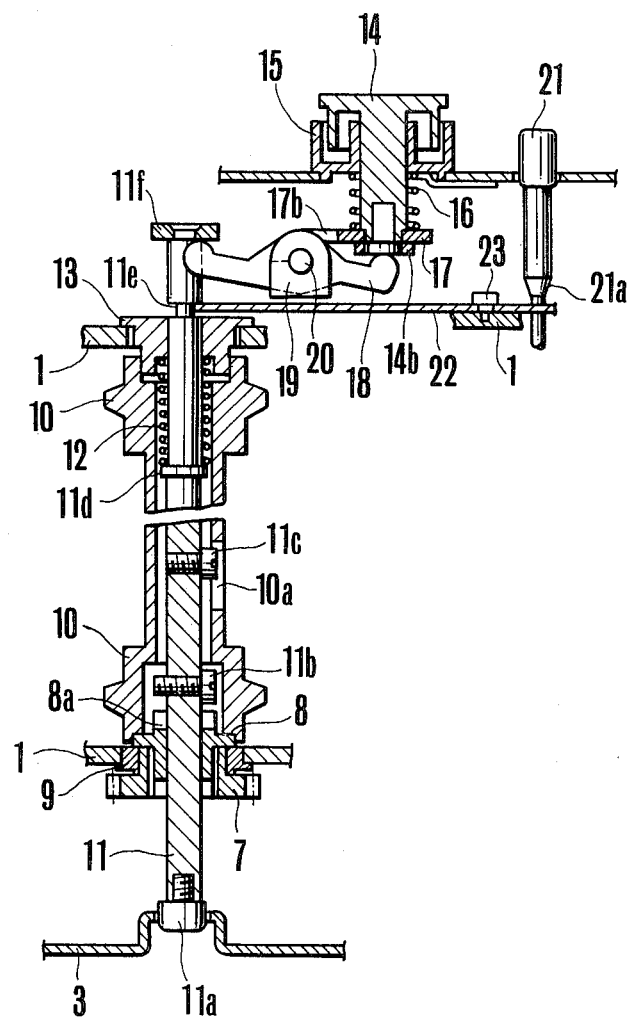
FIG. 2 is a similar view of FIG. 1 except that a film rewinding position of the present invention is shown.
Figure 5:
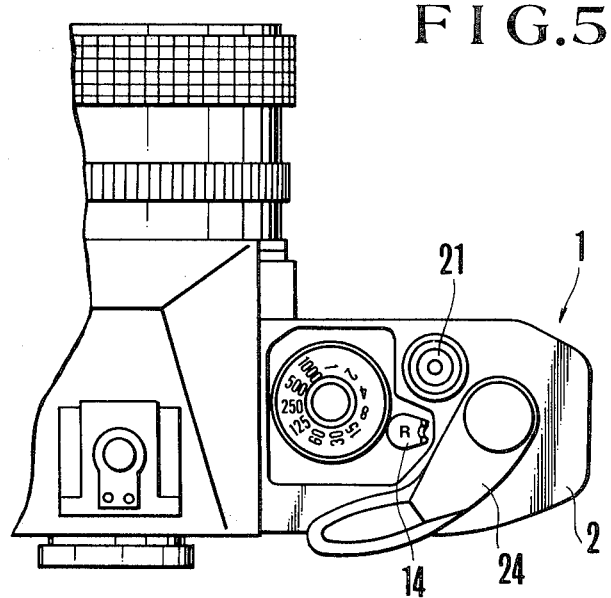
FIG. 5 is a fragmentary top plan view of a camera employing the device of the invention when set in the film winding mode.

With the camera set in the film winding mode, the various parts take the positions of FIGS. 1, 2 and 5. In this case, one end (17a side) of the down stroke of the prohibiting member 17 abuts on the inner surface of the upper panel 2 and is restricted in such a position as illustrated in FIG. 3. At that time, the opposite end (17b side) of the down stroke takes its place just above the shaft support member 19. Thus, even when the first rewind button 14 is unintentionally pushed down, the first rewind button 14 cannot reach the terminal end of downward movement, as the prohibiting member 17 acts on the shaft support member 19.

Figure 4:
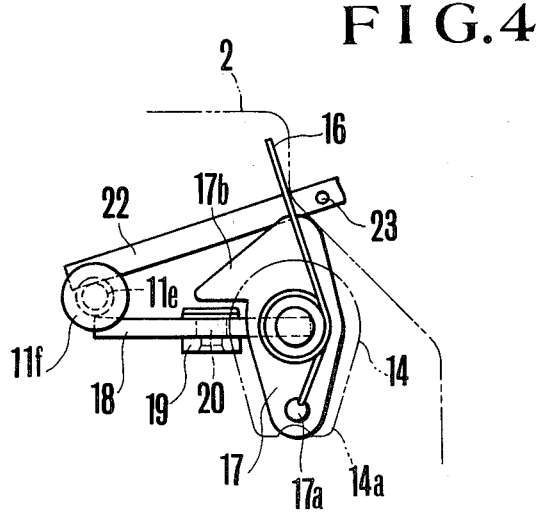
FIG. 4 is a top view of FIG. 2.
Figure 6:
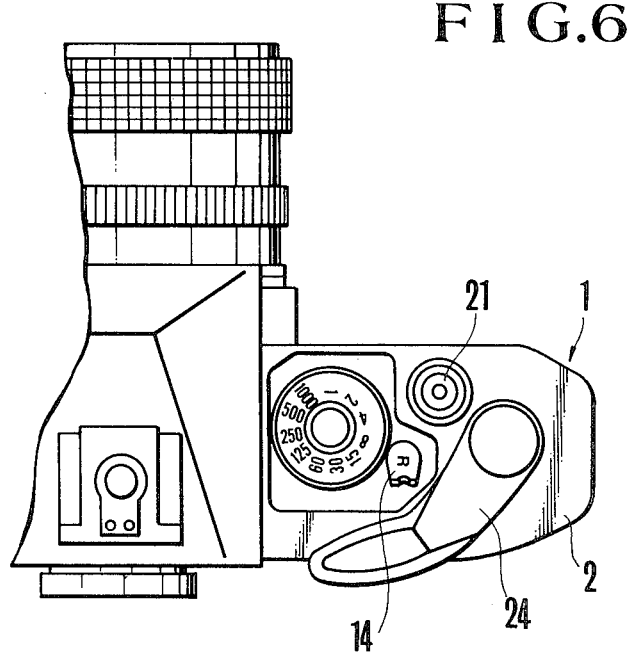
FIG. 6 is a view similar to FIG. 5 showing the film rewinding mode.

Next, when in the film rewinding mode, the various parts take the positions of FIGS. 2, 4 and 6. To switch the camera from the film winding to the rewinding mode, the photographer first puts his finger on the abutment 14a of the first rewind button 14 and then turns the latter in the clockwise direction from the position of FIG. 3, until the corner of the prohibiting member 17 contacts with the inner side of the upper panel 2, whereby the prohibiting member 17 and the first rewind button 14 are brought into the position of FIG. 4. Since, at this time, the prohibiting member 17 is taken out of alignment with the shaft support member 19, the photographer can push down the first rewind button 14 to the full length. Then, when the first rewind button is actuated, the downward motion of the button 14 is transmitted through the lever 18 to lift the sprocket shaft 11 upwards, whereby the clutch member 11b is taken out of connection with the engagement portion 8a of the clutch 8 and the sprocket 10 is rendered freely rotatable. At the same time, the latch lever 22 enters the groove 11e to retain the rewinding mode. Also since, in the downmost position of the first rewind button 14, the nose 17b of the prohibiting member 17 creeps beneath the shaft 20, the prohibiting member 17 is hindered from returning under the action of the spring 16, thus holding the first rewind button 14 in the position of FIG. 2.

Next, after the film has been rewounded, when the shutter release button 21 is pushed down, the latch lever 22 is caused to turn in the clockwise direction about the shaft 23 in FIG. 3, and to disengage from the groove 11e. Then, the sprocket shaft 11 is driven by the spring 12 to move downwards. As it moves, the changeover lever 18 reacts to lift the first rewind button 14 upwards and the nose 17b is taken out of the latching engagement with the shaft 20. Then, the prohibiting member 17 and the first rewind button 14 while being turned in the counter-clockwise direction by the spring 16 are returned by the same spring to the position of FIG. 1.

Also, at this time, the sprocket 10 and the sprocket shaft 11 are set again to cooperate with each other so that the sprocket 10 is rendered responsive to operation of the winding lever 24.

It is now to be noted that the second rewind button 11a when pushed upwards as viewed in FIG. 1 can effect an equivalent result such that the clutch 8 is cut off by the clutch member 11b disengaging from the recess 8a. In this case, though the upward movement of the sprocket shaft 11 permits the changeover lever 18 to be freely rotatable, the first rewind button 14 resumes the position of FIG. 1, because the prohibiting member 17 interferes with the shaft support member 19. Such upward movement of the shaft 11 also causes the latch lever 22 to engage in the groove 11e which is subsequently followed by operations similar to those described above.

In short, the foregoing embodiment has features apart from the fact that the rewind button 11a is arranged in the bottom panel of the camera housing, in that there is provided another rewind button 14 which is arranged in the upper panel of the camera housing. Furthermore, as the lock means for preventing accidental actuation of the latter rewind button 14, use is made of the prohibiting member 17 and this prohibiting member 17 first cooperates with the shaft support member 19 to hinder the rewind button 14 from actuation, and at the terminal end of rotative movement of the rewind button 14 as illustrated in FIG. 4 the rewind button 14 is released from the locking connection, and after this releasing operation of the lock means the camera can be changed over from the film winding to the film rewinding mode by pushing down the button 14.

It is, however, to be understood that the present invention is not confined to this embodiment and may take, for example, a form wherein the first rewind button 14 is not arranged so that when in the position of FIG. 1, pushing it down is impossible, but instead so that while the first rewind button 14 is itself freely movable downwards at any time, it is only after the first rewind button 14 has been turned to the position of FIG. 4 that the prohibiting member 17 can act on the changeover lever 18 at one end thereof. In this case, it is only when the first rewind button 14 is turned, the first rewind button 14 and changeover lever 18 are brought into operative connection with each other. That is, though in the foregoing embodiment, the changeover lever 18 is operated directly by the first rewind button 14, it is made effective through the intermediary of the member 17, as the member 17 is arranged to engage the changeover lever when the first rewind button 14 has been turned. If so, in a manner similar to that described in connection with the foregoing embodiment, rotative movement followed by downward movement of the first rewind button 14 will result in moving the sprocket shaft 11 upwards, whereas mere downward movement of the first rewind button 14 does not operate to transmit this downward motion to the changeover lever 18.

As has been described in greater detail above, the present invention provides a film winding and rewinding device with an operating member movable in a first direction and in a second direction and a changeover member for changing over the camera from the winding mode to the rewinding mode, whereby when the aforesaid operating member is moved in the first direction, a subsequent movement in the second direction is made effective to actuate the changeover member. Therefore, there is no possibility of occurrence of actuation of the changeover member other than when the necessity arises, and it never happens at a time during the use of one roll of film that the camera is accidentally switched to the rewind mode. Thus, an advantage is provided in that successive picture frames on the film are all spaced apart from each other by accurately equal distances without fail.

Another advantage of the invention is that changing over from the winding to the rewinding mode is made quicker and far easier than was heretofore possible, which contributes to an improvement in the manageability of the camera. That is, according to the present invention, only one operating member suffices to perform two functions in that the camera is made ready for changeover and that the winding mode is changed to the rewinding mode, by a continuous series of operations.

While specific embodiments of the invention have been shown and described in detail to illustrate the application of the inventive principles, it will be understood that the invention may be embodied otherwise without departing from such principles.

What is claimed is:

1. A film winding and rewinding device for a camera comprising:
   changeover means for changing over the camera from the winding mode to the rewinding mode;
   operating means movable in a first direction and in a second direction, said operating means when manually moved in said first direction making said changeover means ready to be actuated, and when said movement in said first direction is followed by a movement in said second direction, actuating said changeover means;
   cover means for having a guide hole for said operating means, said changeover means being covered by said cover means; and
   locking means for preventing said operating means from moving in said second direction, and when said operating means is moved in said first direction, for allowing said operating means to move in said second direction, said locking means being covered by said cover means.

2. A device according to claim 1, wherein said first direction and said second direction are orthogonal to each other.

3. A device according to claim 2, wherein said operating means is provided in one of the panels of said camera other than the bottom panel.

4. A device according to claim 1 further comprising:
   first bias means urging said changeover means in a direction to the winding mode;
   holding means for holding said changeover means when said changeover means is in the rewinding position; and
   second bias means urging said operating means in said second direction, said second bias means exerting a smaller force than said first bias means.

5. A device according to claim 4 wherein said holding means is released from the holding connection with said changeover means in response to actuation of a release operation of said camera.

6. A device according to claim 1 further comprising:
   second locking means for preventing said operating means from restoring in a direction reverse to the first direction when said operating means is operated in the first direction and succeedingly operated in the second direction.

7. A device according to claim 4 further comprising:
   second locking means for preventing said operating means from restoring in a direction reverse to the first direction when said operating means is operated in the first direction and succeedingly operated in the second direction.

8. A film winding and rewinding device for a camera comprising:
   changeover means for changing over the camera from the winding mode to the rewinding mode;
   operating means movable in a first direction and in a second direction, said operating means when moved in said first direction making said changeover means ready to be actuated, and when said movement is said first direction is followed by a movement in said second direction, actuating said changeover means;
   first prohibiting means for prohibiting said operating means from moving in said second direction, said first prohibiting means being released from said prohibiting connection by moving said operating means in said first direction;
   first bias means urging said changeover means in a direction to the winding mode;
   holding means for holding said changeover means when said changeover means is in the rewinding position; and
   second bias means urging said operating means in said second direction, said second bias means exerting a smaller force than said first bias means.

9. A device according to claim 8, wherein said holding means is released from the holding connection with said changeover means in response to actuation of a release operation of said camera.

* * * * *